United States Patent [19]

Di Vita

[11] 4,178,066

[45] Dec. 11, 1979

[54] RAY-PATH EQUALIZER FOR SIGNAL-TRANSMISSION SYSTEM USING MULTIMODE LIGHT GUIDES

[75] Inventor: Pietro Di Vita, Torino, Italy

[73] Assignee: CSELT Centro Studi e Laboratori Telecomunicazioni S.p.A., Torino, Italy

[21] Appl. No.: 816,209

[22] Filed: Jul. 15, 1977

Related U.S. Application Data

[63] Continuation-in-part of Ser. No. 779,821, Mar. 21, 1977, Pat. No. 4,128,302, and a continuation-in-part of Ser. No. 793,420, May 3, 1977, Pat. No. 4,134,639.

[30] Foreign Application Priority Data

Jul. 16, 1976 [IT] Italy ............................ 68784 A/76

[51] Int. Cl.² .................................................. G02B 5/14
[52] U.S. Cl. ................................... 350/96.18; 350/96.19
[58] Field of Search ................. 350/96.15, 96.18, 96.19

[56] References Cited

U.S. PATENT DOCUMENTS

| | | | |
|---|---|---|---|
| 3,759,590 | 9/1973 | Arnoud | 350/96.18 |
| 3,809,455 | 5/1974 | Pekaw et al. | 350/96.18 |
| 3,832,030 | 8/1974 | Gloge | 350/96.18 |
| 3,975,082 | 8/1976 | Winzer | 350/96.19 |
| 3,980,391 | 9/1976 | Stewart | 350/96.18 |
| 4,077,701 | 3/1978 | Steensma et al. | 350/96.19 |

*Primary Examiner*—Stewart J. Levy
*Attorney, Agent, or Firm*—Karl F. Ross

[57] ABSTRACT

Signals, especially short pulses, are transmitted by way of a series of aligned light guides with internally reflecting boundaries (i.e. fibers or foils), with interposition of two identical transparent elements each refracting incident rays from the proximal guide end toward the remote guide end along paths which intersect the common guide axis at points near the center of the respective element for angles of incidence close to zero and at points near the center of the opposite element for angles of incidence close to a critical angle $\Theta_M << 1$ (in radians). The transparent elements could be planoconvex lenses, which may be divided into Fresnel zones, or holograms; they could also be replaced by an optically equivalent transparent body whose refractive index varies along a generally parabolic law with increasing distance from the axis.

8 Claims, 13 Drawing Figures

RAY-PATH EQUALIZER FOR SIGNAL-TRANSMISSION SYSTEM USING MULTIMODE LIGHT GUIDES

CROSS-REFERENCE TO RELATED APPLICATIONS

This is a continuation-in-part of my copending applications Ser. No. 779,821, filed 21 Mar. 1977 now U.S. Pat. No. 4,128,302, and Ser. No. 793,420, field 3 May 1977 now U.S. Pat. No. 4,134,639.

FIELD OF THE INVENTION

My present invention relates to an optical equalizer for a system in which signals, especially binary ones represented by short spikes (so-called Dirac pulses), are transmitted with the aid of multimode light guides.

BACKGROUND OF THE INVENTION

A light guide as herein contemplated may be either a single optical fiber, a group of optical fibers arrayed in a flat bundle or ribbon, or a light-conducting foil. In each instance the light guide has internally reflecting boundaries with a critical angle of reflection determined by the difference between the refractive indices of the guide substance and the surrounding medium. As is well known, light rays striking the guide boundary at a glancing angle, not exceeding the critical value, are totally reflected and thus do not leave the confines of the guide. In traveling along their transmission path, they bounce back and forth between opposite guide surfaces and eventually leave the exit end of the guide at an inclination to its axis which depends upon the angle of incidence.

Theoretically, at least, a ray may pass along the axis of a straight guide without internal reflection. Such a ray has the shortest transit time through the guide in comparison with rays undergoing reflection, the longest time being that of a ray exiting from the guide surface at the critical or guidance angle. These relative delays of light rays originating at a common modulated source result at the receiving end in a broadening of the pulses and thus in a distortion of the signal. That distortion, of course, increases with the length of the transmission path.

A variety of equalizers have already been suggested for dealing with this problem. One such equalizer, described by D. C. Gloge in an article entitled "Fiber-Delay Equalization by Carrier Drift in the Detector", *Optoelectronics*, vol. 5, 1973, pages 345–350, operates electronically on the electric pulses derived from the luminous signal at the receiving end; the light rays emerging at different angles from the exit end of an optical fiber are electronically detected in separate zones working into delay lines which introduce compensatory differences in transit time. Such a system, requiring active electronic components, is relatively complex and limited to specific radiation receivers. In commonly owned U.S. Pat. No. 4,094,578 granted to me jointly with Riccardo Vannucci, an optical signal-transmission system has been disclosed and claimed in which the equalization of the light paths is carried out with the aid of mirrors interposed between cascaded light guides angularly adjoining one another.

Other solutions, such as those suggested in U.S. Pat. Nos. 3,759,590 and 3,832,030, provide optical equalizers with refractive cones or lenses serving for a compensatory refraction of light rays incident at different angles.

The presence of three or more refractive bodies between confronting guide ends in systems of the last-mentioned type results in a significant attenuation of the luminous radiation, especially for slanting light rays which strike the surfaces of these bodies at almost a glancing angle and are therefore subject to heavy Fresnel losses.

In my above-identified copending application Ser. No. 779,821 I have disclosed a path-length equalizer comprising two identical transparent lens members of positive refractivity spaced apart along a common axis or centerline of the aligned light guides between which the equalizer is disposed, each of these lens members having a cross-section in at least one longitudinal plane of symmetry of the light guides which consists of two symmetrical truncated lens profiles having a boundary on that centerline. That boundary is offset from the optical axes of the truncated lens profiles, these axes thus lying on opposite sides of the centerline; each lens profile extends from the centerline (and therefore also from the aforementioned boundary) to at least a point of interception of a limiting ray converging at the closer light-guide end, the path of such limiting ray extending from that point of interception at a lens profile of one lens member to the geometrical center of the other lens member and thence substantially along the centerline to the more distant light-guide end.

With an equalizer of this type I have been able to reduce the broadening of a signal pulse in such an optical transmission system by up to about 75%. While that amount of reduction is satisfactory in many instances, situations exist — especially with long transmission paths — where the remaining signal distortion is still inadmissible.

In my other copending application referred to above, Ser. No. 793,420, I have disclosed an equalizer in the form of a transparent body or block with a nonuniform index of refraction varying symmetrically from the centerline outwardly within the aforementioned longitudinal plane of symmetry, this body having a transverse entrance face and a transverse exit face spaced by the same distance s from the light-emitting end of one light guide and from the light-collecting end of the other light guide, respectively. The limiting light rays leaving the center of the emitting guide end at a critical angle $\Theta_M$ with reference to the centerline strike the entrance face at points spaced from that centerline by a distance $r_M = s \cdot \tan\Theta_M$, the refractive index increasing progressively from the centerline outwardly over substantially the distance $r_M$ and thereafter decreasing progressively over a further distance which preferably equals or exceeds $r_M$ and in any event must be sufficient to deflect the limiting ray within the body back toward the centerline over a generally sinusoidal first path ending substantially tangentially to the centerline at the exit face whereby that ray continues substantially along the centerline to the collecting guide end. On the other hand, thanks to the reciprocity of the ray paths, a central or paraxial ray leaving the emitting guide end substantially along the centerline is deflected within the body over a generally sinusoidal second path which is longitudinally shifted with reference to the first path and ends at the exit face substantially at a distance $r_M$ from the centerline whereby this central ray continues to the collecting guide end substantially at the critical angle $\Theta_M$. Thus, the paraxial and limiting rays are effectively transposed to equalize their path lengths. If the variations of the refractive index of the transparent body on each side of the centerline within the aforementioned longitudinal plane (or within any such plane in the case of a centrally symmetrical guide system) represent a substantially symmetrical function of distance having an inversion point at the distance $r_M$, the various ray paths within the body will be substantially symmetrical about an ancillary axis spaced from the centerline by the distance $r_M$. In that case the length of the body between its two transverse faces should be substantially equal to 3/2 times the distance between successive points of intersection of any sinusoidal ray path with that ancillary axis, this length being then equal to three quarter-wavelengths of the sine curve represented or approximated by these paths.

The one-body equalizer just described yields results similar to those attainable with the two lens members of an equalizer according to my first-filed prior application. In both instances the path lengths of light rays exiting from the emitting guide end at near-critical angles and at near-zero angles are made substantially the same, yet no special consideration is given to the intermediate rays.

OBJECT OF THE INVENTION

The object of my present invention, therefore, is to provide an improved version of an equalizer of the type disclosed in either of my two copending applications which is effective over virtually the full angular range between zero and $\Theta_M$.

SUMMARY OF THE INVENTION

If we consider two aligned light guides of equal length k separated by an equalizer which converts an incoming axial ray into an outgoing ray including with the axis the critical angle $\Theta_M$ (or vice versa), then we find that the light travels a distance k in one guide and a distance $k/\cos \Theta_M = k \cdot \sec \Theta_M$ in the other guide, the combined path length being thus $k(1 + \sec \Theta_M)$. Any intermediate ray, zig-zagging in the two guides at angles $\Theta$ and $\Theta'$, respectively, will have a total path length given by $k(\sec\Theta + \sec\Theta')$. Thus, in the ideal case, the equalizer should satisfy the relationship $$\sec\Theta + \sec\Theta' = 1 + \sec\Theta_M. \tag{1}$$

A ray leaving the center of the light-emitting guide end at the critical angle $\Theta_M$ will strike the entrance face of the equalizer, separated from that guide end by a distance s, at a distance $r_M$ from the axis given by $$r_M = s \cdot \tan\Theta_M. \tag{2}$$

With the type of guide to which the invention is applicable, wherein $\Theta_M \ll 1$ (measured in radians), we can write $\tan \Theta_M \approx \Theta_M$ whereupon, from the well-known relationship $\sec \Theta \approx 1 + \Theta^2/2$, equation (1) is converted to $$\Theta^2 + \Theta'^2 \approx \Theta_M^2 \tag{3}$$

whereas equation (2) becomes $$r_M \approx s\Theta_M. \tag{4}$$

Analogously, the point of incidence of any ray striking the entrance face at an angle $\Theta$ may be considered spaced from the axis by a distance $r = s\Theta$; the point of emergence of a ray leaving the exit face of the equalizer at the conjugate angle $\Theta'$ is then spaced from the axis by a distance $r' = s\Theta'$.

With an equalizer of the type disclosed in my application Ser. No. 779,821, comprising two identical transparent elements spaced apart from each other by a distance d and from the proximal light-guide ends by equal distances s, a limiting ray incident at angle $\Theta_M$ on the first transparent element is refracted along a path which intersects the common axial line of the two guides at the center of the second transparent element. For such a limiting ray, therefore, the first element (and thus also the second element) may be regarded as a refractive lens of focal length $f_M$ whose reciprocal is the sum of the reciprocals of the object and image distances s and d in conformity with the laws of optics, i.e.

$$1/f_M = 1/s + 1/d. \tag{5}$$

I have found, in accordance with my present invention, that the desired conjugacy between angles $\Theta$ and $\Theta'$ is realized if the power of each transparent element varies as a function of r (or r') in such a manner as to satisfy, in the ideal case, the relationship $$\frac{1}{f(r)} = \frac{1}{s} + \frac{1}{d} \cdot \left[ 1 \pm \sqrt{\left(\frac{s \cdot \Theta_M}{r}\right)^2 - 1} \right] \tag{6}$$

where r varies between O and $r_M$.

For the limiting case of $r = r_M$, of course, equation (6) reduces to equation (5) in view of the relationship given by equation (4). At the other end of the range, with $r = 0$, the right-hand term of equation (6) becomes infinite so that $f_0 = 0$. Thus, the point of intersection of the path of the deflected rays with the axial line shifts between the center Q of the first element (for $r = 0$) and the center Q' of the second element (for $r = r_M$).

If the distances of that point of intersection from centers Q and Q' are respectively designated x and x', with $x + x' = d$, we can rewrite equation (6) as $$\frac{1}{x} = \frac{1}{f(r)} - \frac{1}{s} = \tag{7}$$

$$\frac{1}{d} \cdot \left[ 1 \pm \sqrt{\left(\frac{s \cdot \Theta_M}{r}\right)^2 - 1} \right] = \frac{1}{d} \cdot (1 \pm Y)$$

where Y varies between ∞ and 0.

The transparent elements of an improved equalizer of this character may be a pair of positively refractive lens members generally similar to those disclosed in my application Ser. No. 779,821 whose cross-section in the aforementioned plane of symmetry (or in any axial plane in the case of a centrally symmetrical system) consists of two symmetrical truncated lens profiles on opposite sides of the common guide axis. Though these lens profiles could be symmettrically biconvex, as in the embodiments described in my earlier application, their design can be simplified by giving them a planoconvex shape, preferably with their planar faces confronting each other. In either case, though, the convex face or faces need not be geometrically continuous but could be subdivided into a multiplicity of Fresnel zones differing in their focal length as discussed above.

On the other hand, these transparent elements could also be constituted by holograms introducing a phase shift in conformity with the desired ray paths as is well known per se.

In an analogous manner, the refractive index of a transparent body of an equalizer according to my copending application Ser. No. 793,420 may be varied as a function of distance r in such a way that equation (1) is substantially satisfied.

The term "light", as herein used, is not necessarily limited to radiation in the visible spectrum.

BRIEF DESCRIPTION OF THE DRAWING

The above and other features of my invention will now be described in detail with reference to the accompanying drawing in which.

SPECIFIC DESCRIPTION

Figure 1:
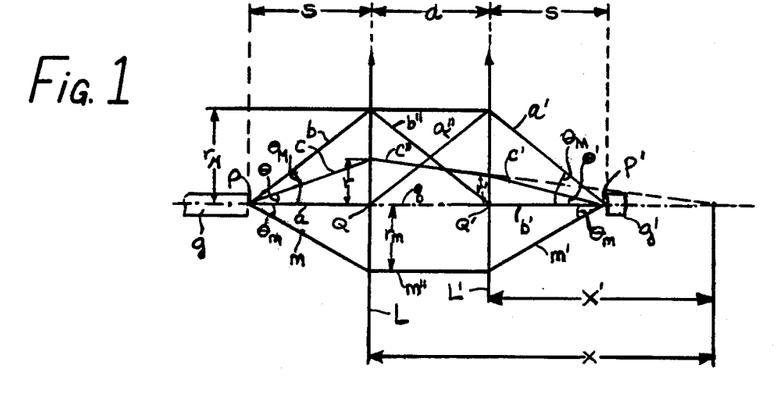
FIG. 1 is a schematic view of an equalizer according to my invention including two identical lens members inserted between confronting ends of two cascaded light guides, pursuant to the teachings of my copending application Ser. No. 779,821.

In FIG. 1 I have shown an end of an incoming light guide g and a confronting end of an outgoing light guide g' centered on a common axis g. It is assumed that these light guides are linear and of substantially the same length so that, if the two guides were closely juxtaposed, a ray passing axially through guide g from a nonillustrated light source would continue axially through light guide g' to its destination whereas a ray propagated within guide g with internal reflections at a a critical angle $\Theta_M$ would continue in the same manner within guide g'. Thus, the first-mentioned ray would travel from the source to the load in a shorter time than the last-mentioned ray, with resulting distortion of a signal pulse.

A path-length equalizer according to my inventon, designed to make the travel times of these two rays (as well as intermediate ones striking the guide walls at lesser angles) substantially the same, comprises two lens members L, L' of positive refractivity spaced apart along centerline q, these lens members being symmetrical about that line and of identical construction with respective geometrical centers Q, and Q' separated from each other by a distance d and from the centers P, P' of the proximal guide ends by equal distances s. Line g could be either an axis of symmetry or the projection of an axial plane, depending on whether light guides g, g' are filaments or foils.

Lens members L and L', indicated only schematically in FIG. 1, may have profiles in the plane of the drawing as described hereinafter with reference to FIG. 4 or 6, for example. The minimum height of each lens member on either side of axis g is given by the radial distance $r_M$ of a point at which a limiting ray b, arriving via guide g and emerging from its center P at a critical angle $\Theta_M$, strikes the entrance face of lens L. Angle $\Theta_M$ may or may not have the same value as the limiting angle within light guides g and g', depending on whether the space between the guide ends and the lens members L, L' is occupied by a medium having the same refractive index as the light guides (such a medium usually occupying in that case also the space between the two lens members) or is of a different character, e.g. air.

The refractivity of lens members L and L' is such that, in conformity with the teachings of my prior application Ser. No. 779,821, the limiting ray b is deflected by lens member L toward the center Q' of lens member L' whence it passes at b' along axis g to the center P' of guide g'. Conversely, an incoming axial ray a leaving the center P of guide g is deflected outwardly at the center Q of lens member L (this being true, strictly speaking, only for rays deviating slightly from the axis) and, on reaching lens member L', is redirected to the center P' of light guide g' as an outgoing ray a' including the same critical angle $\Theta_M$ with the axis. The paths of axial ray a and limiting ray b between lens members L, L' have been designated a'' and b'', respectively.

An intermediate ray c, passing from point P to lens member L at an angle of incidence $\Theta$, is refracted by that lens member along a path c'' toward lens member L' where it is further refracted, as shown at c', toward point P' at an angle $\Theta'$ conjugate with angle $\Theta$ in accordance with equation (1). The continuation of path c'' intersects the axis g at a point whose distance from centers Q and Q' is given by x and -x', respectively, with x-x'=d as noted above. Ray c strikes the entrance face of lens L at a point spaced from axis g by a distance r; the corresponding distance of the point where ray c' leaves the exit face of lens L' has been designated r'.

In FIG. 1 I have also shown a symmetrical ray m, with an angle of incidence $\Theta_m$, whose path m'' between lens members L and L' is parallel to axis g and which emerges from Lens L' along a path m' including the same angle $\Theta_m$ with the axis.

Figure 2:
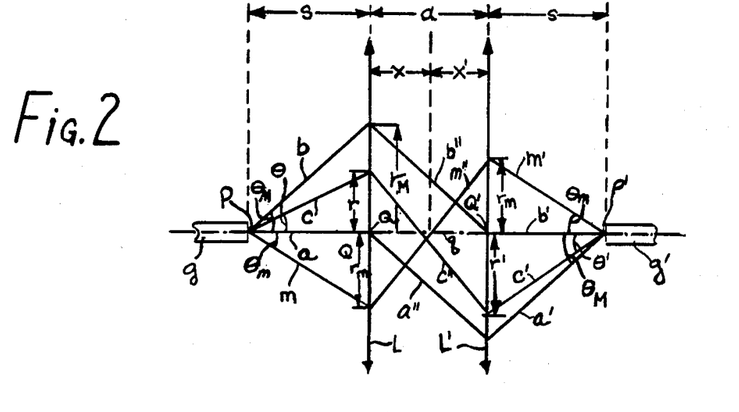
FIG. 2 is a view similar to FIG. 1, showing an alternate solution.

FIG. 2 shows a system differing from that of FIG. 1 by the fact that the interlens paths c'' and m'' of intermediate rays c and m intersect the axis g instead of lying more or less parallel thereto. In this instance, the symmetrical ray m cuts across the axis at a point midway between the two lens members L and L' for which $x=-x=d/2$, compared with $x=-x=\infty$ for the corresponding point of FIG. 1. These relationships are true, according to equation (6), for $s\Theta_m \approx r_m = r\sqrt{2}$ with the term under the square root equal to 1; with a positive sign before the square root, $1/f_m = 1/s + 2/d$, whereas a negative sign yeilds $1/f_m=1/s$ or $f_m=s$. The lenses L and L' of FIG. 2 may have profiles in the plane of the drawing as described hereinafter with reference to FIG. 5 or 7, for example.

With a given set of parameters s, d and $s \cdot \Theta_M \approx r_M$ the desired variation of the refractive power f as a function of radius r according to equation (6) is satisfied when lens members L and L' have a planoconvex profile whose thickness $z_0-z$ in the axial direction ($z_0$ being the lens thickness along the axis) varies with radius 4 according to the relationship $$z = -\frac{1}{n-1}\left[\frac{r^2}{2s} + \frac{r^2}{2d} \pm \frac{1}{2d}(r\sqrt{r_M^2-r^2} + r_M^2 \cdot \arcsin\frac{r}{r_M})\right] + z_0 - K \quad (8)$$

Figure 8:
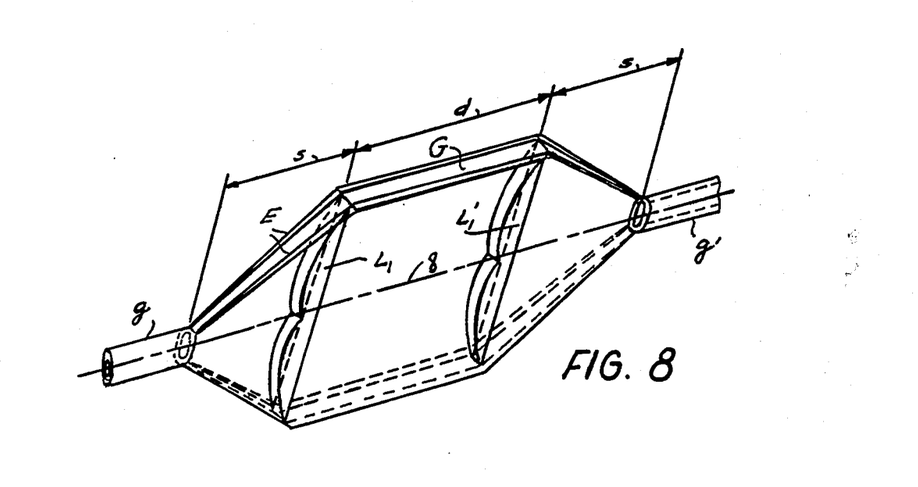
FIG. 8 is a perspective view of an equalizer incorporating lens members of the type shown in FIG. 4 surrounded by a medium of the same refractive index as the light guides.

(K being a constant), yielding two solutions with the same limiting values, namely $z=0$ for $r=0$ and $$z = -\frac{r_M^2}{2(n-1)} \cdot (\frac{1}{s} + \frac{1}{d} + \frac{\pi}{2d})$$

for $r=r_M$ with $K=z_0$. Equation (8) applies, of course, only to the case where the lens members are surrounded by air or vacuum; if they are embedded (as in FIG. 8) in a medium of refractive index $n_g$ corresponding to that of the associated light guides, the denominator $(n-1)$ changes to $(n-n_g)$.

Figure 3A:
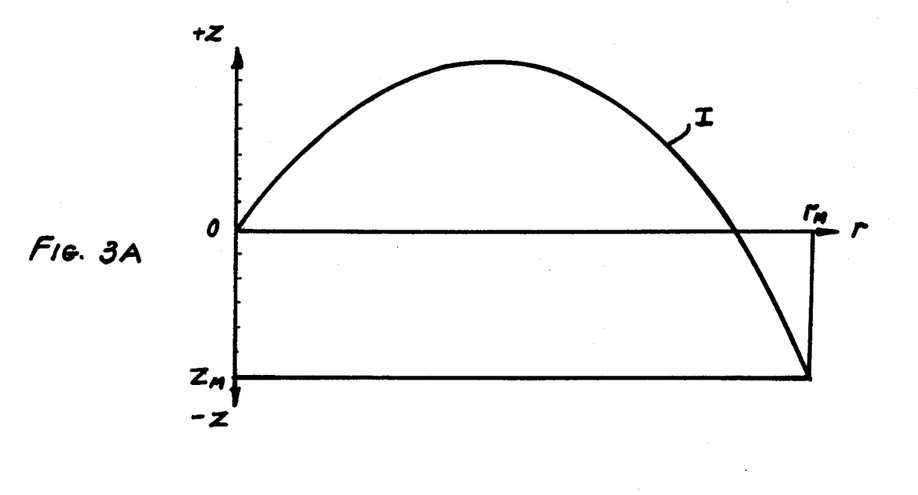
FIGS. 3A and 3B are a pair of graphs representing the shapes of the optically effective faces of the lens members in the systems of FIGS. 1 and 2, respectively.
Figure 3B:
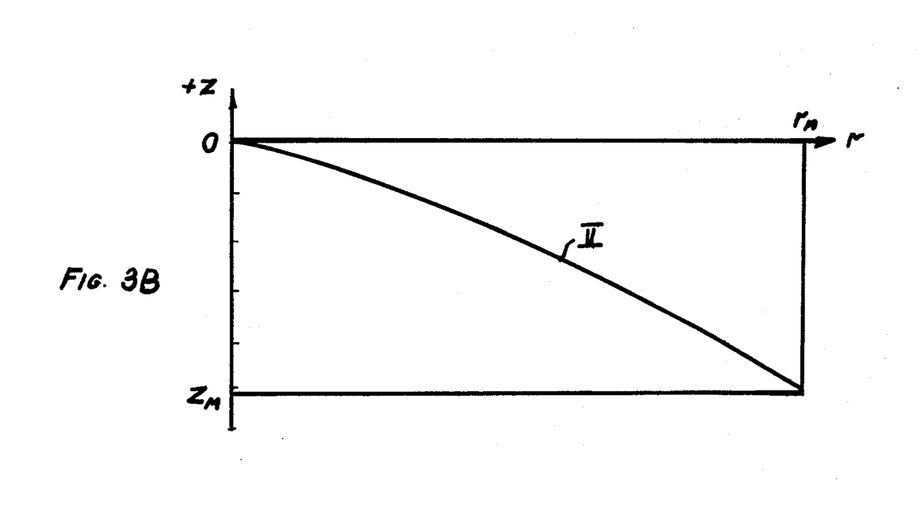

In FIG. 3A I have represented the function $z(r)$ as a curve I corresponding to equation (8) in the case where the sign before the square root is negative, assuming again that $K=z_0$. FIG. 3B depicts an analogous curve II representing the same equation with positive sign. Whereas z assumes only negative values in curve II, it is at least partly positive in curve I; in the latter instance, with the term under the square root disappearing for $r=r_M$, $z_M$ goes to zero for $d=s(\pi/2-1)$ so that z has negative values only for larger values of d.

Figure 4:
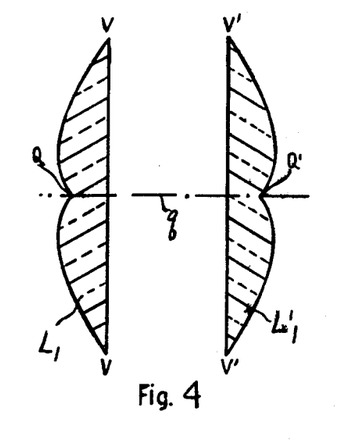
FIGS. 4 and 5 are cross-sectional views of two pairs of lens members, shaped in conformity with the curves of FIG. 3, for the systems of FIGS. 1 and 2, respectively.

Lens members, $L_1$ and $L_1'$ shown in FIG. 4 have profiles corresponging to curve I of FIG. 3A, symmetrically duplicated on opposite sides of axis g. The planar faces of the two lens members confront each other whereas their convex faces are turned toward the respective guide ends proximal thereto (not shown in the FIGURE). In a centrally symmetrical lens member, used with filamentary light guides, these convex faces approach a toroidal shape; with ribbon-shape guides they are flat, as shown in FIG. 8, and have a constant cross-section in a direction perpendicular to the plane of the drawing. At points Q and Q' each lens member has the thickness $z_0$; at points V and V' its thickness $z_0-z$ is zero in the assumed case of $K=z_0$.

Figure 5:
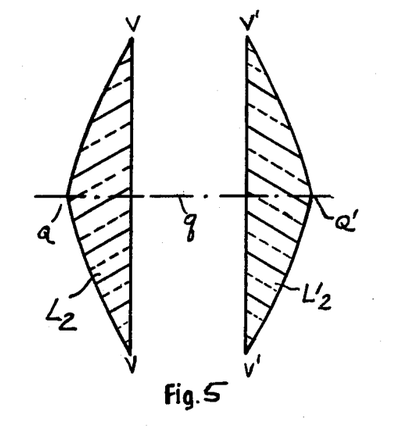

FIG. 5 shows lens members $L_2$ and $L_2'$ whose profiles correspond to curve II of FIG. 3B but which otherwise conform to lens members L and L' of FIG. 4. In their centrally symmetrical version they are of cuspate shape.

Figure 6:
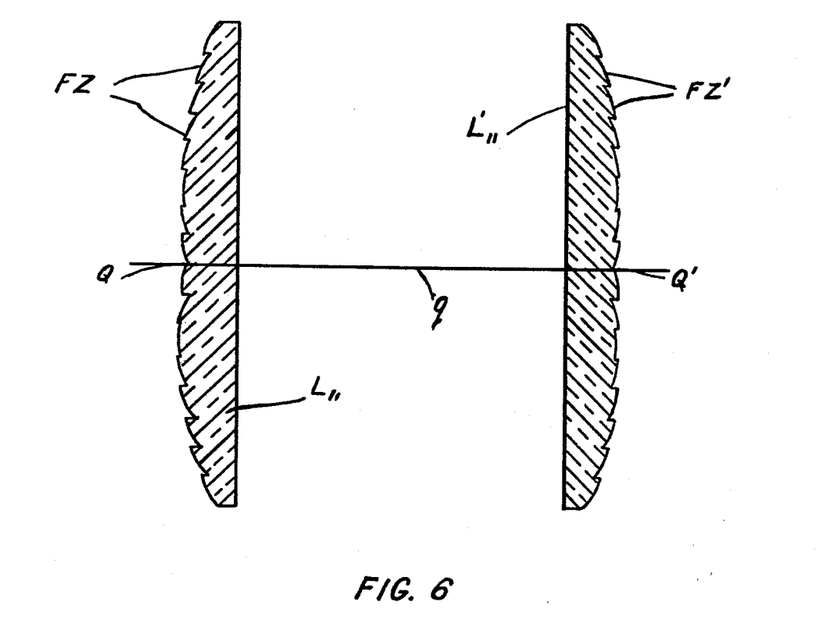
FIGS. 6 and 7 are cross-sectional views of two pairs of modified lens members adapted to be used in the systems of FIGS. 1 and 2, respectively.
Figure 7:
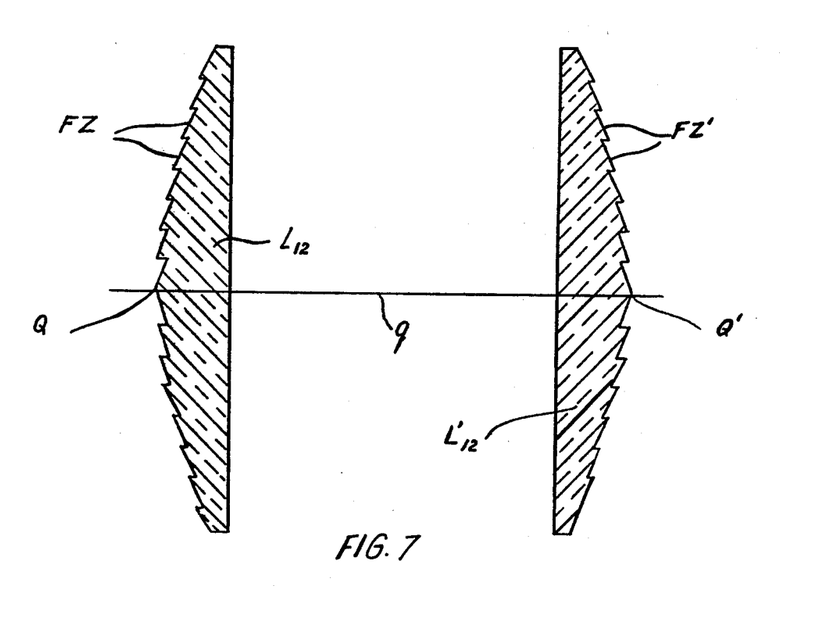

In FIGS. 6 and 7 I have shown two pairs of lens members $L_{11}$, $L_{11}'$ and $L_{12}$, $L_{12}'$ whose profiles differ from those of FIGS. 4 and 5 by being divided into a multiplicity of Fresnel zones FZ, FZ'. The convex curvature of each Fresnel zone corresponds, substantially, to a respective segment of curve I (FIG. 3A) in the case of lenses $L_{11}$, $L_{11}'$ or of curve II (FIG. 3B) in the case of lenses $L_{12}$, $L_{12}'$, yet the small radial height of each zone allows the substitution of arc segments therefor whereby these zones are spherically (or circularly cylindrically) shaped with respective focal lengths determined by equation (6). For greater precision, of course, equation (8) may be strictly adhered to within the limits of the variable r given for each zone, except for a change of the constant K from one zone to the next.

In FIG. 8, already referred to above, light guides g and g' are shown to be ribbon-shaped, with a core of generally rectangular cross-section whose minor dimension is so small as to give rise to only a single mode of propagation in a plane transverse to the plane of FIG. 4 (lens members L and L' in FIG. 8 have the same profile as members $L_1$ and $L_1'$ of FIG. 4, though they could obviously also conform to the lens members shown in FIG. 5, 6 or 7). The lens members are enveloped in a transparent body G whose refractive index $n_g$ equals that of the sheathed cores of light guides g and g'. The lateral surfaces of these light guides, body G and lens members L, L' are coated with continuous reflecting layers E of different refractive index forming extensions of the guide sheaths.

Figure 9:
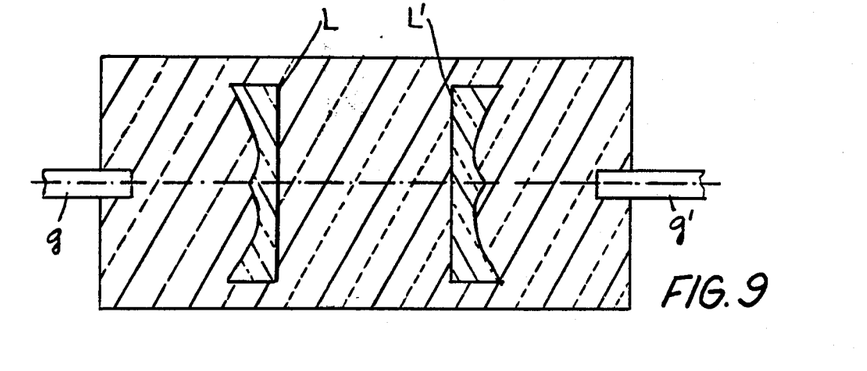
FIG. 9 is a view in axial section of an equalizer similar to that of FIG. 8 but with an inversion of the relative refractive indices of the lens members and the surrounding medium.

Lens members L and L' could also consist of a material, possibly air, having a lower refractive index than the surrounding medium (member G). In that instance the active lens faces will be essentially concave rather than convex, as illustrated in FIG. 9, while still conforming to curve I (or II) and equation (8).

Figure 10:
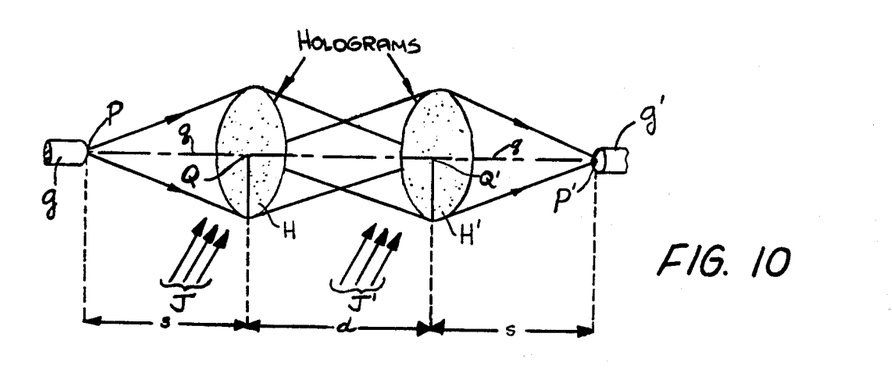
FIG. 10 is a schematic view of another equalizer according to my invention including two identical holograms.

FIG. 10 illustrates an embodiment of my invention in which the lens members L, L' have been replaced by holograms H, H' centered on axis q and transluminated by the incoming light rays from guide g passing toward guide g'. These holograms are illuminated by beams J, J' of coherent light such as a laser. In traversing the holograms H and H', which may be produced with the aid of a lens conforming to equation (6), the guided light rays are bent in a manner corresponding to the law of refraction of the lens member itself. The distances s and d between points P, Q, and Q' and P' are analogous to those of the preceding embodiments.

Figure 11:
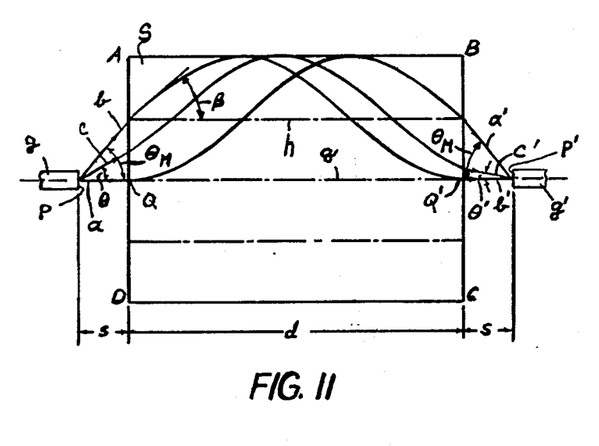
FIG. 11 is a schematic view of an equalizer according to my invention with nonuniform refractive index pursuant to the teachings of my copending application Ser. No. 793,420.

In FIG. 11 I have shown a transparent body S, symmetrical about centerline q in at least the plane of the drawing, which has a transverse entrance face A–D and a transverse exit face B–C separated from each other by a distance d; these faces are intersected by centerline q at points Q and Q'. The center P of the emitting end of guide g is separated from entrance face A–D by a distance s; a like distance s separates the exit face B–C from the center P' of the collecting end of guide g'. The overall structure of this equalizer is thus generally similar to that of the two-lens equalizers shown in preceding FIGURES.

Figure 12:
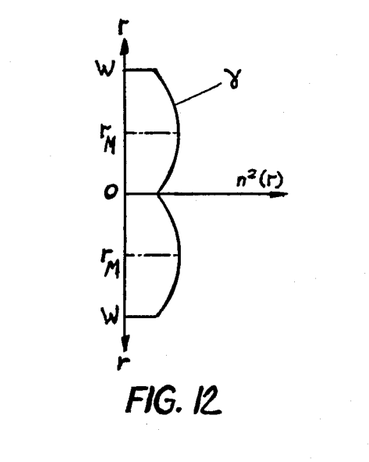

Body S has a refractive index n(r) varying as a function of distance r from centerline q, the square $n^2(r)$ of that function being represented by a curve $\gamma$ in FIG. 12. Such a varying index of refractivity can be produced, for example, by the so-called CVD chemical vapor deposition) technique. Curve $\gamma$ has two symmetrical branches, above and below centerline q, each representing a continuous and generally parabolic function with an inversion point or vertex at a radial distance $r_M$ from the centerline; the index could also vary, however, in small incremental steps rather than continuously. At a radial distance $w=2r_M$, constituting half the minimum width of body L, the curve has a discontinuity causing internal reflection; thus, at lines A–B and D–C (where $r=w$), the body may terminate, undergo a sharp reduction of its refractive index or be provided with a reflecting layer.

The law of variation of the refractive index n(r) is so chosen that, as illustrated in FIG. 11, a limiting light ray b leaving the guide g at point P and including the critical angle $\Theta_M$ with centerline q will strike the face A–D of body S at a point where the refractive index n(r) has its maximum value, i.e. at distance $r_M$ from the centerline. On entering the optically denser body S, the ray will continue along a less steep path and, encountering progressively smaller refractive indices in the outer zone of the body beyond a lone h lying at radial distance $r_M$, will be deflected along a substantially sinusoidal curve with a peak in the vicinity of boundary A–B (or D–C in the case of a ray symmetrical to the one here contemplated). The resulting sine curve, symmetrical about an axis represented by line h, intersects that axis a second time at a distance d/3 from exit face B–C so as to have a negative peak in the vicinity of centerline q at that exit face. From there the ray continues substantially along the centerline, as indicated at b', to point P' of guide g'.

Theoretically, at least, a ray leaving the point P exactly along centerline q would pass straight through the body S to point P'. However, a paraxial ray a inclined ever so slightly with reference to the centerline will encounter a progressively increasing refractive index within the inner zone of body S, i.e. up to line h, and will thereupon follow a substantially sinusoidal path which is esentially the miror image of curve b, b' and which therefore encounters the exit face B–C at its intersection with axis h, i.e. at distance $r_M$ from the centerline. From that exit point the ray then continues along a line a', including a critical angle $\Theta_M$ with centerline q, to point P' of guide g'.

An intermediate ray m, inclined at a lesser angle $\Theta$ when emitted from guide g at point P, is deflected along a similar sinusoidal ray path lying between those of rays a and b, continuing from the exit face to point P' along a straight line at an angle $\Theta'$ conjugate with angle $\Theta$. Thus, practically all the rays emitted at point P are collected at point P' after undergoing a change in inclination substantially equalizing their respective path lengths through guides g and g'.

The law of variation of the refractive index is derived from equation (6), on the basis of the well-known eikonal equation $$|\Delta W|^2 = N^2(r),$$

where W is the wave function. The result is a mode of refraction satisfying equation. (1).

I claim:
1. In an optical signal-transmitting system, in combination:
   two aligned light guides with confronting ends respectively emitting and collecting bundles of light rays whose limiting rays include a critical angle $\Theta_M$, of a magnitude for which $\Theta_M \approx \tan \Theta_M$, with a common axial line of said light guides in at least one longitudinal plane of symmetry thereof; and
   an equalizer between said light guides comprising two identical transparent elements spaced apart from each other by a distance d and from the light-guide ends proximal to them by a equal distances s, each of said elements refracting rays from the proximal light-guide end, incident at an angle $\Theta$ within said plane of symmetry, toward the remote light-guide end along paths intersecting said axial line at points whose distance x from the center of the respective element is given substantially by

$$\frac{1}{x} = \frac{1}{d} \cdot \left[ 1 \pm \sqrt{\left(\frac{s \cdot \Theta_M}{r}\right)^2 - 1} \right].$$

2. The combination defined in claim 1 wherein said elements are holograms.

3. The combination defined in claim 1 wherein each of said elements is a positively refracting lens member.

4. The combination defined in claim 3 wherein each lens member has a planar face confronting the other lens member and a convex face confronting the proximal light-guide end.

5. The combination defined in claim 3 wherein each lens member has a cross-section in said plane of symmetry consisting of two symmetrical truncated lens profiles on opposite sides of said common axial line.

6. The combination defined in claim 3 wherein said lens member is divided into a multiplicity of Fresnel zones symmetrically grouped on opposite sides of said common axial line.

7. The combination defined in claim 3 wherein said lens members are embedded in a madium of substantially the same index of refractivity as said light guides, said medium extending at least to the two light-guide ends.

8. The combination defined in claim 7 wherein said lens members have a lower index of refractivity than said medium, each lens member having a planar face confronting the other lens member and a concave face confronting the proximal light-guide end.

* * * * *